(12) United States Patent
Jilani et al.

(10) Patent No.: US 7,046,415 B2
(45) Date of Patent: May 16, 2006

(54) MICRO-MIRRORS WITH FLEXURE SPRINGS

(75) Inventors: Adel Jilani, Corvallis, OR (US); James Guo, Corvallis, OR (US); Kenneth Faase, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 33 days.

(21) Appl. No.: 10/719,222

(22) Filed: Nov. 21, 2003

(65) Prior Publication Data

US 2005/0111069 A1   May 26, 2005

(51) Int. Cl.
*G02F 1/03* (2006.01)
*G02F 1/07* (2006.01)
(52) U.S. Cl. .................... 359/245; 359/224; 359/865; 359/872
(58) Field of Classification Search .......... 359/197–98, 359/212–13, 220–21, 247, 245, 223–26, 359/855, 865, 230–31, 290–91, 850–51, 359/862, 871–74; 310/306–307
See application file for complete search history.

(56) References Cited

U.S. PATENT DOCUMENTS

| | | | |
|---|---|---|---|
| 5,066,084 A * | 11/1991 | Culp | 359/213 |
| 6,028,689 A | 2/2000 | Mickalicek et al. | 359/224 |
| 6,147,790 A * | 11/2000 | Meier et al. | 359/291 |
| 6,436,853 B1 | 8/2002 | Lin et al. | 438/800 |
| 6,633,426 B1 * | 10/2003 | Shrauger et al. | 359/290 |
| 6,775,174 B1 * | 8/2004 | Huffman et al. | 365/149 |
| 2003/0010826 A1 * | 1/2003 | Dvorkis et al. | 235/462.37 |
| 2005/0036196 A1 * | 2/2005 | Barnea et al. | 359/291 |
| 2005/0046918 A1 * | 3/2005 | Yasuda et al. | 359/224 |
| 2005/0073736 A1 * | 4/2005 | Guo et al. | 359/291 |
| 2005/0128564 A1 * | 6/2005 | Pan | 359/291 |

* cited by examiner

*Primary Examiner*—Jordan M. Schwartz
*Assistant Examiner*—Jessica Stultz

(57) ABSTRACT

A micro-mirror device includes a micro-mirror and a flexure spring supporting the micro-mirror. The flexure spring is configured to store potential energy during movement of the micro-mirror that is released as kinetic energy to drive movement of the micro-mirror when the micro-mirror is re-oriented.

40 Claims, 5 Drawing Sheets

MICRO-MIRRORS WITH FLEXURE SPRINGS

BACKGROUND

Spatial light modulators (SLMS) are devices that modulate incident light in a spatial pattern to form an image corresponding to an electrical or optical input received by the SLM. The incident light may be modulated in phase, intensity, polarization, or direction. SLMs have numerous applications. For example, SLMs are currently used in the areas of projection displays, video and graphics monitors, televisions, optical information processing and electrophotographic printing.

An SLM is typically comprised of an array of individually addressable picture elements that correspond to the pixels in a frame of image data. A stream of image data is input to the SLM and each individual picture element is driven according to a corresponding pixel in a frame of the image data. The image data is thus displayed on the SLM one frame at a time One type of SLM is a micro-mirror array in which each of the individually addressable picture elements is a microscopic mirror that can be moved according to the image data received. Conventional micro-mirror devices include an array of electrostatically actuated mirrors fabricated by CMOS (complementary metal-oxide-semiconductor) compatible processes over a memory cell on a silicon substrate. To meet the high frequency requirements for some video applications, the device must be able to drive each micro-mirror from one extreme landed position to another with a relatively high speed. This must be done while transition time and impact energy are minimized and operational robustness is maximized.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

One current goal in micro-mirror design is to achieve a high transition speed for each individual micro-mirror. In other words, each micro-mirror needs to individually transition quickly from one angular position to another as incoming video data dictates. This is also referred to as the "crossover transition." A high crossover transition speed is needed for many digital display applications in which the micro-mirrors of the array must respond quickly to data for successive image frames.

Figure 1:
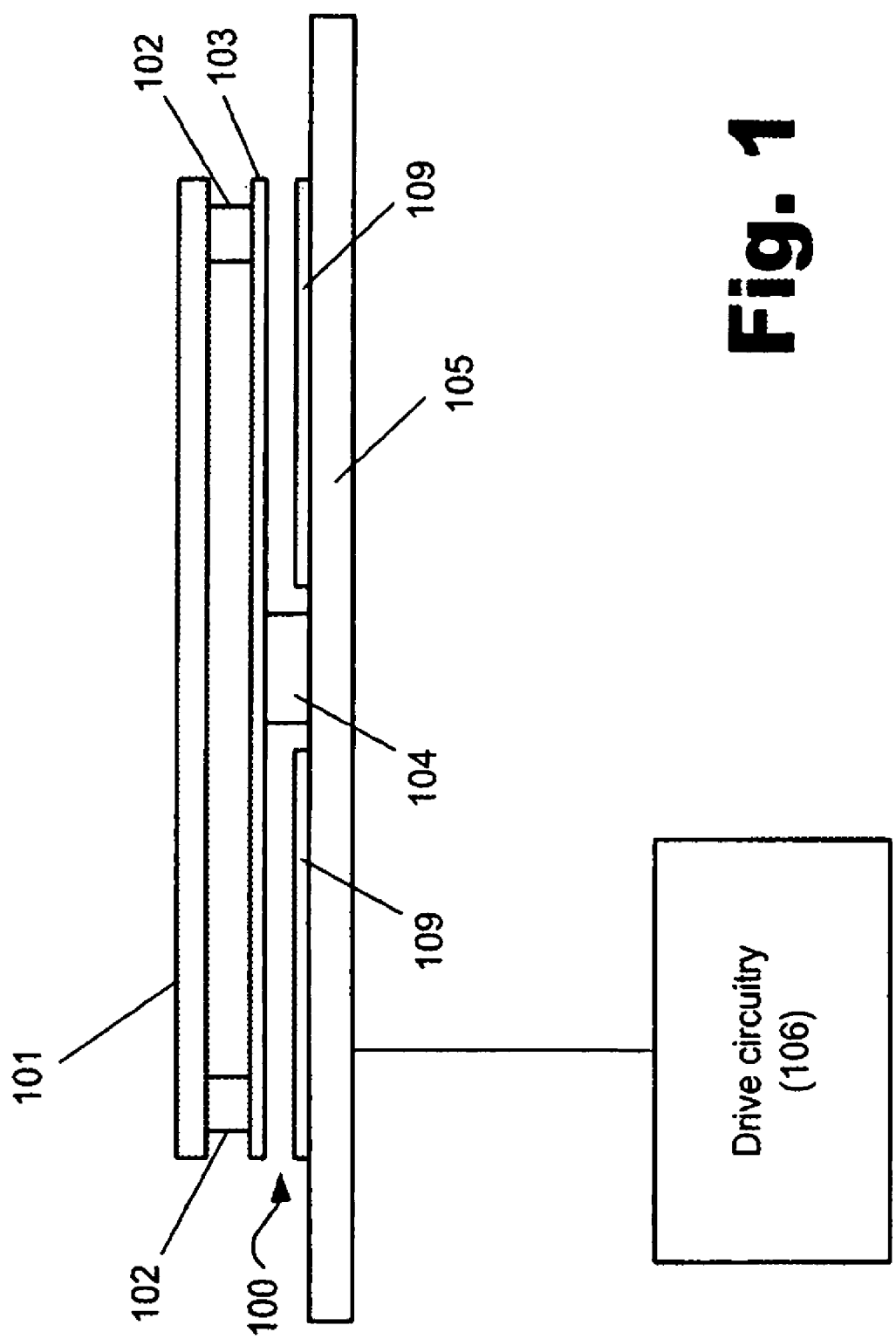
FIG. 1 is a side view of a micro-mirror and flexure spring according to one embodiment.

The present specification describes a micro-mirror that is supported on a non-torsional flexure spring. When the micro-mirror is moved or tilted according to incoming video or image data, the pliant flexure spring stores potential energy caused by the movement of the micro-mirror against the bias of the flexure spring. This potential energy is converted to kinetic energy when the position of the micro-mirror is subsequently changed and serves to much more quickly reorient the micro-mirror. In other words, the mirror is driven by a flexure spring that stores enough elastic strain energy during a mirror tilting phase to significantly reduce the transition time in another direction through the efficient release of the stored strain energy as kinetic energy for crossover transition FIG. 1 is a side view of a micro-mirror and flexure spring or pliant flexure according to the principles described herein. The micro-mirror (101) may be one in an array of micro-mirrors supported on a substrate (105). The substrate (105) may be, for example, a silicon, glass or plastic substrate.

Each individual micro-mirror (101) is supported on a non-torsional flexure spring (100) which will be described in more detail below. In a rest or default position, as shown in FIG. 1, the micro-mirror (101) is held by the flexure spring (100) in an orientation substantially parallel with the substrate (105).

The flexure spring (100) includes a post (104). A flexure (103) sits atop the post (104) and runs along the underside of the mirror (101). Two supports (102), at either end of the flexure (103), support the mirror (101) on the flexure (103) and separate the mirror (101) from the flexure (103). The post (104), flexure (103) and supports (102) can all be formed from a single layer of material. Alternatively, the supports (102) and the mirror (101) can be formed together from a second layer of material.

As shown in FIG. 1, drive circuitry (106) is provided to control the micro-mirror (101). The drive circuitry (106) may be formed on the substrate (105). The flexure spring (100) can be driven by the drive circuity (106) electrostatically or peizoelectrically, for example, to tilt the mirror (101) to a different angle with respect to the substrate (105). As indicated above, the drive circuitry (106) will drive the micro-mirror (101) in response to incoming image data and, particularly, in response to the pixel data for a particular pixel that is represented by the micro-mirror (101) in the current image frame.

In the presently illustrated embodiment, electrodes (109) are formed on the substrate (105) under the flexure (103). In this embodiment, the drive circuitry (106) is electrically connected to and drives these electrodes (109) to create a particular electrostatic field. The flexure (103) will respond to the electrostatic field created by the electrodes (109) and tilt the mirco-mirror (101).

However, the flexure (103) also has a bias which, when the flexure spring (100) is not driven by the drive circuitry (106), causes the flexure spring (100) to hold the mirror (101) in a particular orientation with respect to the substrate (105). As shown in FIG. 1, this default orientation may be with the mirror (101) substantially parallel to the substrate (105).

As indicated, when the flexure spring (100) is driven by the drive circuitry (106), the flexure (103) bends to tilt the mirror (101) to a desired angular orientation. However, this motion is against the natural bias of the flexure (103). Thus, potential energy is stored in the flexure (103) while the flexure (103) and mirror (101) are driven out of the default orientation (e.g., FIG. 1) by the drive circuitry (106).

When the drive circuitry (106) stops driving the flexure (103), or if the signal from the drive circuitry (106) begins to drive the flexure (103) in a different direction, this potential energy is released as the flexure (103) moves with its bias to, or beyond, the default orientation. This release of potential energy and the bias of the flexure (103) cause the mirror (101) to reorient to a new desired orientation much more quickly than would be the case if the bias and potential energy of the flexure (103) were not assisting to move the mirror (101).

Figure 2:
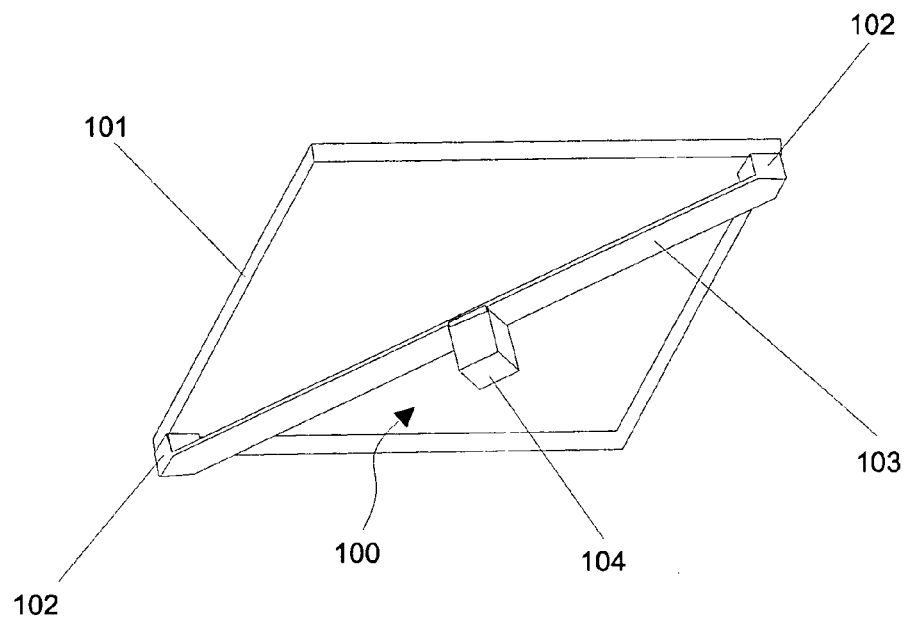
FIG. 2 is a view of the underside the micro-mirror and flexure spring of FIG. 1.

FIG. 2 is a view of the underside the micro-mirror and flexure spring of FIG. 1. As shown in FIG. 2, the flexure (103) of the flexure spring (100) may run diagonally between opposite corners of a square or rectangular micromirror (101).

The post (104) is located substantially in the center of the flexure (103). The supports (102) may be square (cubic) or rectangular in shape. Alternatively, the supports (102) may be round or circular in shape. With corners of the supports (102) being matched into corners of the mirror (101). The ends of the flexure (103) may also be pointed to match to the corners of the mirror (101) and supports (102).

Figure 3:
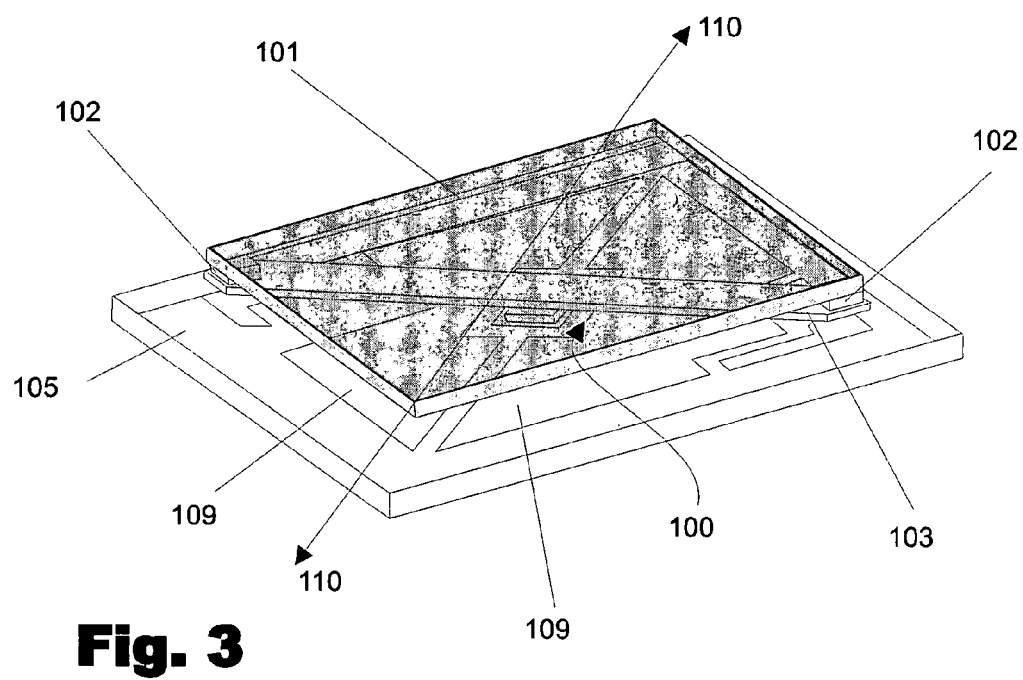
FIG. 3 is an illustration of the mirco-mirror and flexure spring of FIGS. 1 and 2 on a supporting substrate.

FIG. 3 illustrates the mirror (101) and the flexure spring (100) formed or mounted on a substrate (105). As indicated above, the substrate (105) may be, for example, a silicon, glass or plastic substrate. The elements of the flexure spring (100) are illustrated in ghost to indicate being below or under the mirror (101).

Additionally, as shown in FIG. 3, the electrodes (109) are formed on the substrate (105) for driving the micro-mirror (101). Axis (110) is the axis about which the mirror (101) tilts. Separate electrodes (109) are formed on either side of the axis (110). Thus, as the electrodes (109) are driven by the drive circuitry (106, FIG. 1) to create an electrostatic field that will attract the flexure (103), the mirror tilts about the axis (110). In other words, the corners of the mirror (110) supported on the supports (102) move toward or away from the substrate (105) in response to the electrostatic field created by the electrodes (109).

Figure 4:
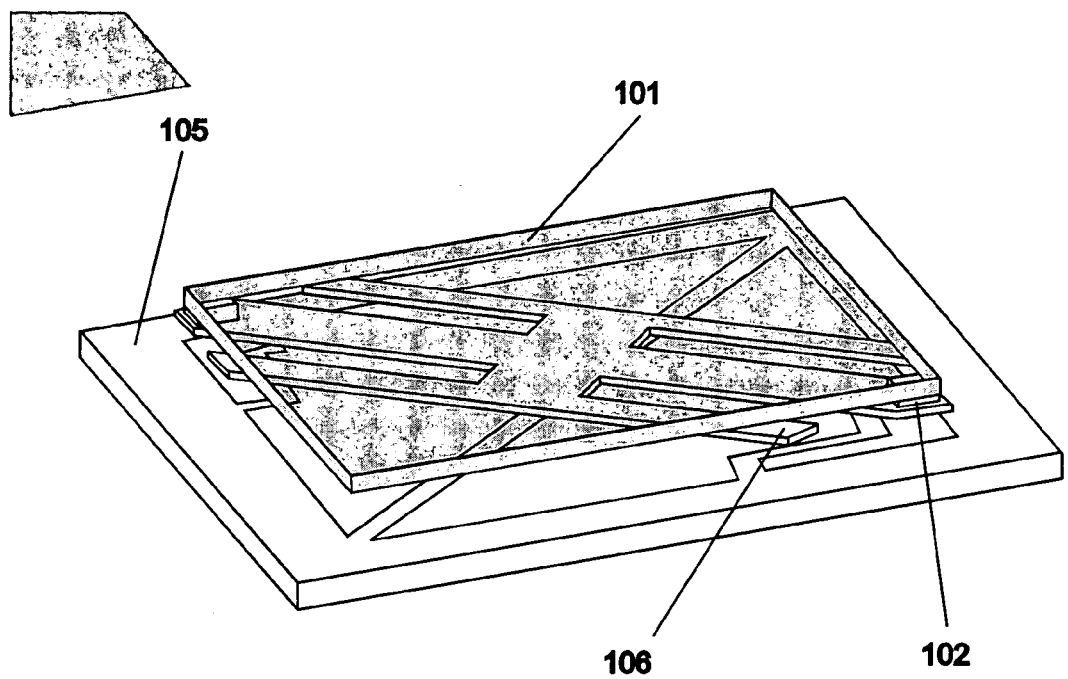
FIG. 4 is an illustration of a micro-mirror element according to another embodiment.

FIG. 4 is similar to FIG. 3, but illustrates another embodiment in which additional flexures (106) are formed under the mirror (101). Thus, the flexure (103) may be formed as a plurality of flexures (106) extending from the post (104) along an underside of the micro-mirror (101). These additional flexures (106) make contact with the underside of the mirror (101) when the mirror (101) is driven. This is true whether the mirror is driven electrostatically or piezoelectrically. The additional flexures (106) are thus bent against bias by the tilting of the mirror (101). When the mirror (101) is no longer driven, the bias of the additional flexures (106) helps to more quickly return the mirror (101) to, or past, the default, undriven position.

Figure 5:
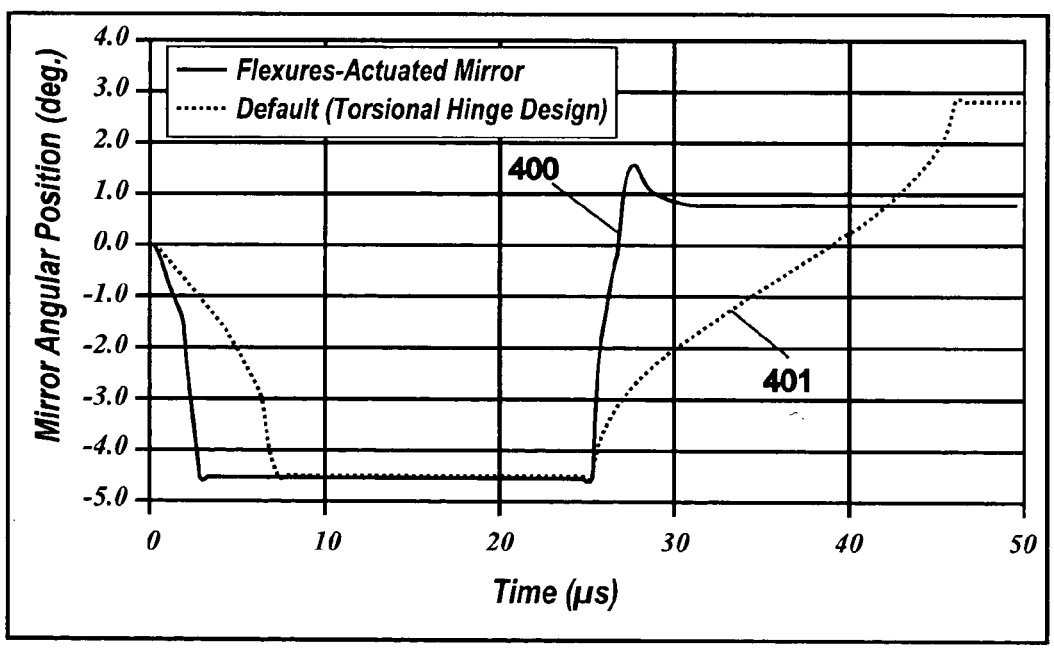
FIG. 5 is a graph showing the response time of the micro-mirror assembly of FIG. 3 as compared with micro-mirrors moved by torsion hinges.

FIG. 5 illustrates the results of modeling the improved response time of a micro-mirror supported on and driven by a flexure spring as described herein and as compared to a conventional micro-mirror on a torsional spring or hinge. The vertical axis gives the angular orientation of the mirror, while the horizontal axis gives time in microseconds.

Trace (400) illustrates the response of a micro-mirror on a flexure spring as described herein. Trace (401) illustrates the movement of a micro-mirror on a conventional torsional spring or hinge. The traces (400 and 401) were generated using a 20 V square waveform.

As shown in FIG. 5, starting from a zero angular deflection, the micro-mirror with a flexure spring (trace 400) reaches an extreme negative deflection significantly faster than a conventional micro-mirror (trace 401). Even more dramatically, between 20 and 30 microseconds, the mirrors are switched from the extreme negative deflection to a positive deflection. The micro-mirror with a flexure spring (trace 400) is able to make the transition almost instantaneously, while the conventional mirror (trace 401) takes significantly longer. Thus, being driven in part by the flexure spring, the micro-mirror can be controlled more consistently and easily.

Figure 6:
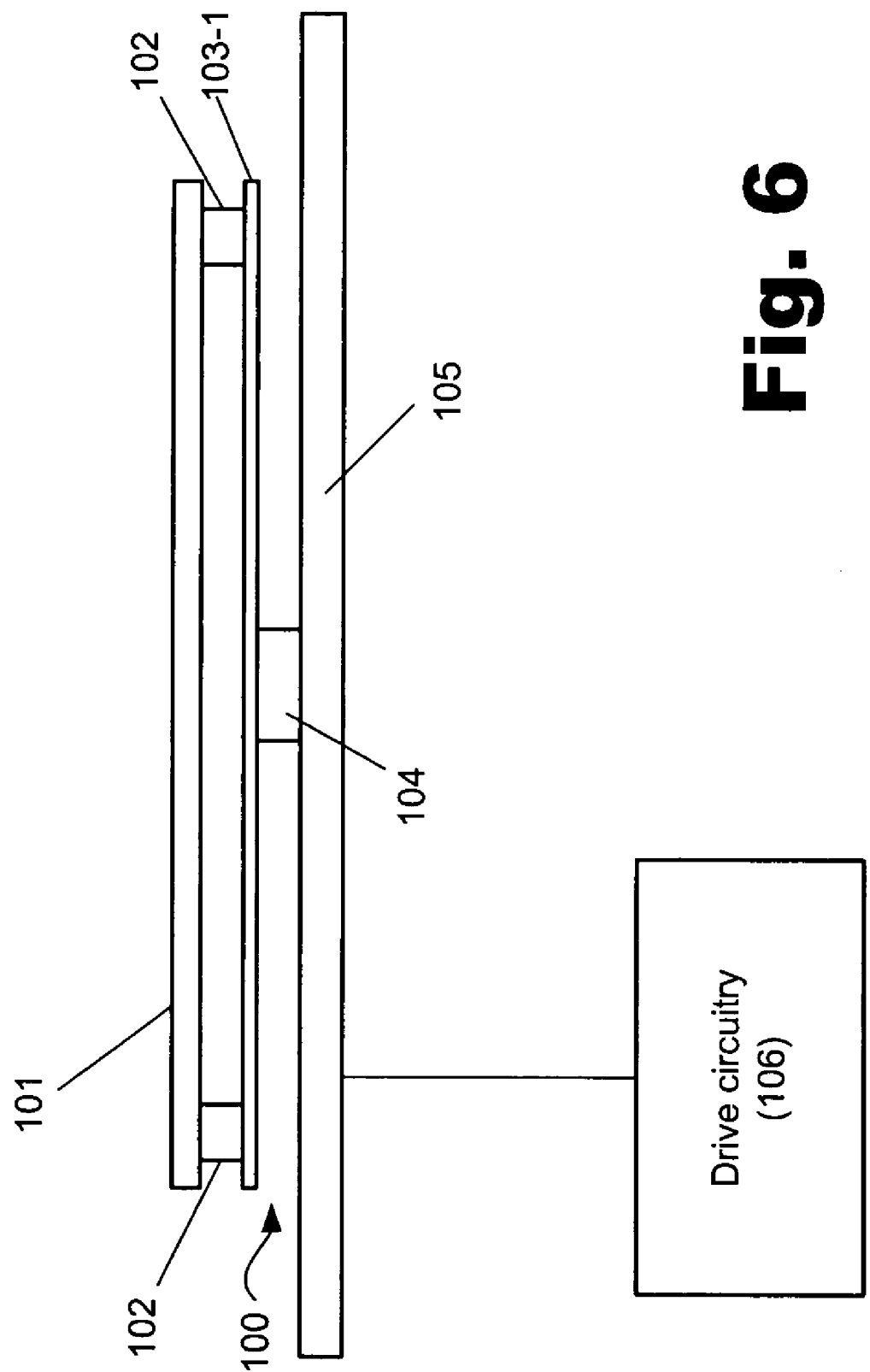
FIG. 6 is a side view of a micro-mirror and flexure spring according to another embodiment.

FIG. 6 illustrates another embodiment of a micro-mirror supported on a flexure spring. The flexure spring (100) in FIG. 6 is driven piezoelectrically rather than electrostatically. Accordingly, the electrodes (109, FIG. 1) on the substrate (105) are not required. Rather, the flexure (103-1) is formed as a piezoelectric unit that will flex when driven electrically. Thus, in this embodiment, the drive circuitry (106) is connected to the piezoelectric flexure (103-1).

When the drive circuitry (106) drives the flexure (103-1), the flexure (103-1) will bend against bias to tilt the mirror (101) in the same manner described above. An opposite current can be applied to opposite sides of the flexure (103-1) or the position of the piezoelectric materials can be reversed in opposite sides of the flexure (103-1), i.e., on opposite sides of the axis (110, FIG. 3). When the driving of the flexure (103-1) ceases, the natural bias of the flexure will help drive the mirror (101) back toward its default or rest orientation. As indicated above, a piezoelectrically driven embodiment can also optionally include the additional flexures (106) illustrated in FIG. 4.

Some micro-mirrors operate in a dielectric liquid disposed on the substrate supporting the mirrors. The dielectric liquid magnifies the mirror tilting and reduces the activation voltage needed to operate the mirror. However, the induced fluid damping also prevents the mirror from being switched from one required tilt angle to another at high frequency (e.g., about 20 KHz).

The use of the flexure spring (100) described herein to support and drive a micro-mirror can also be used to support and drive a micro-mirror in a fluid. As a result, the action of the flexure spring helps overcome the drag of the fluid that damps movement of the mirror. Consequently, the micromirror can be oriented and re-oriented at a sufficiently high frequency while still enjoying the advantages provided by the use of the dielectric fluid. Also, as shown in FIG. 1, the micro-mirror (101) is positioned vertically away from the flexure (103) by the supports (102). This also helps reduce the fluid damping caused by operation in a dielectric fluid as the mirror (101) approaches either extreme angular position.

There are many advantages to supporting a micro-mirror on a flexure spring as described herein. For example, the flexures are less subject to fatigue failure than torsional hinges due to lower mechanical stress. Therefore, the micromirror design described herein should be more robust than designs that use torsional hinges. Additionally, the design described herein can reduce stress concentration problems in the mirror system so that larger electrostatic forces can be applied. This is accomplished by replacing short torsional hinges with the bending flexure springs which greatly reduces the induced stress in the system.

Additionally, with the flexure placed below the mirror no extra space is needed to accommodate the flexure. As indicated, the flexure spring can be actuated using electrostatic or piezoelectric forces and can store enough strain energy during a mirror tilting phase to significantly reduce the transition time to another mirror orientation through the efficient release of the stored strain energy as kinetic energy driving the crossover transition. The micro-mirror design described herein can be optimized to yield maximum extreme angular position by varying the thickness, the electrostatic area (the flexures can have a non-uniform width), initial gap, and material properties of the flexures.

Figure 7:
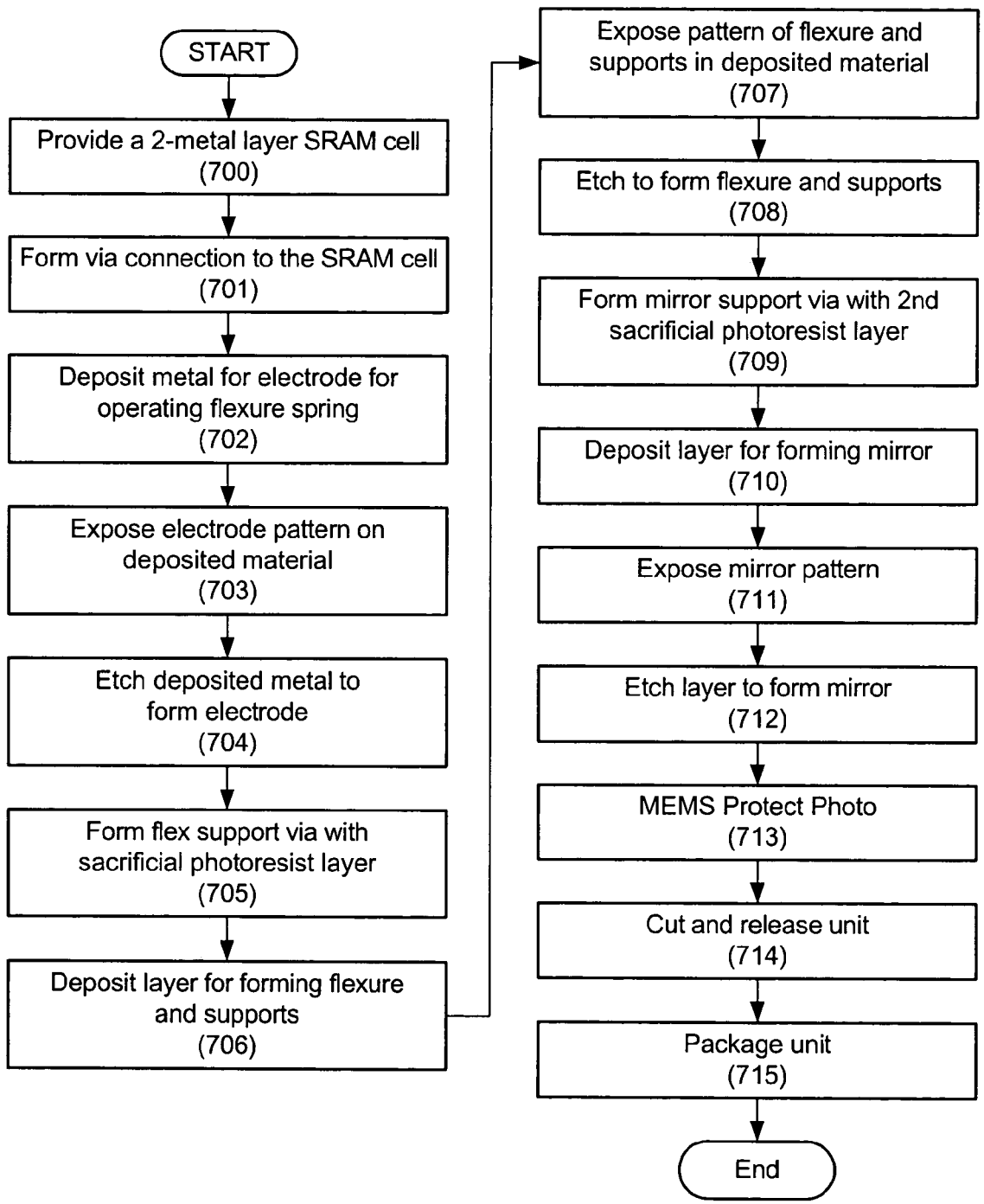
FIG. 7 is a flowchart illustrating a method of making a micro-mirror and flexure spring according to one embodiment.

An exemplary fabrication process for the electrostatically driven embodiment of FIGS. 1–3 is illustrated in FIG. 7. As shown in FIG. 7, the fabrication process may begin with a 2-metal layer Static Random Access Memory (SRAM) cell (step 700). Next, a via is formed to electrically connect the SRAM cell to the flexure spring structure that will be formed (step 701).

A layer of metal material is then deposited to form an electrode in the via (step 702). This electrode will be used to operate the flexure spring and its micro-mirror. This layer of metal material is then exposed using photolithography (step 703) according to the pattern desired for the electrode, including the post (104, FIG. 1) of the flexure spring. The exposed layer of metal material is then etched to form the desired electrode (step 704). Next, the flex support via is formed from a sacrificial photoresist layer (step 705)

Another layer of material is then deposited (step 706). This layer is used to form post, flexure and supports of the flexure spring (100, FIG. 1). This layer is exposed using photolithography according to the pattern of the desired supports (step 707). The exposed layer is then etched to form the post and flexure (step 708). Then, a mirror support via is formed using a second sacrificial photoresist layer (step 709)

Next, a layer of material that will form the mirror (101, FIG. 1) is deposited (step 710). Using photolithography, this layer is next exposed according to the pattern of for the mirror (step 711). The exposed layer is then etched to form the mirror (step 712).

Finally, a Microelectromechanical System (MEMS) protection step is performed (step 713). The wafer or substrate is then sawn and mirror is etched to remove the sacrificial layers so that the mirror can move under the influence of the flexure spring (step 714). Finally, the completed unit is packaged for use (step 715).

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A micro-mirror device comprising:
    a micro-mirror; and
    a flexure spring supporting said micro-mirror, said flexure spring having supports thereon that are attached to said micro-mirror and that space said micro-mirror from said flexure spring;
    wherein said flexure spring is configured to store potential energy during movement of said micro-mirror that is released as kinetic energy to drive movement of said micro-mirror when said micro-mirror is re-oriented.

2. The device of claim 1, wherein said flexure spring comprises:
    a post;
    a flexure supported on said post; and
    said supports being on said flexure and attached to and supporting opposite corners of said micro-mirror.

3. The device of claim 1, wherein said flexure spring comprises a piezoelectric element configured to controllably orient said micro-mirror.

4. The device of claim 1, further comprising electrodes for electrostatically driving said flexure spring to controllably orient said micro-mirror.

5. The device of claim 1, further comprising drive circuitry for driving said spring to orient said micro-mirror.

6. The device of claim 1, wherein said flexure spring is supported on a substrate.

7. The device of claim 6, wherein said substrate comprises silicon.

8. The device of claim 6, wherein said substrate comprises glass or plastic.

9. The device of claim 2, wherein said flexure runs diagonally between opposite corners of said micro-mirror.

10. The device of claim 9, wherein said flexure has a non-uniform width.

11. The device of claim 2, wherein said flexure comprises a plurality of flexures extending from said post along an underside of said micro-mirror, wherein, during operation of said micro-mirror, said plurality of flexures contact said micro-mirror and store energy due to movement of said micro-mirror.

12. The device of claim 2, wherein said supports have a square shape, with corners of said supports being matched with corners of said micro-mirror.

13. An array of micro-mirrors comprising:
    a plurality of micro-mirrors; and
    a flexure spring supporting each said micro-mirror, each said flexure spring having supports thereon that are attached to a corresponding micro-mirror;
    wherein each said flexure spring is configured to store potential energy during movement of a corresponding micro-mirror that is released as kinetic energy to drive movement of said corresponding micro-mirror when said corresponding micro-mirror is re-oriented.

14. The array of claim 13, wherein each said flexure spring comprises:
    a post;
    a flexure supported on said post; and
    said supports being on said flexure and attached to and supporting opposite corners of said micro-mirror.

15. The array of claim 13, wherein each said flexure spring comprises a piezoelectric element configured to controllably orient said corresponding micro-mirror.

16. The array of claim 13, wherein each said flexure spring has a corresponding set of electrodes for electrostatically driving said that flexure spring to controllably orient said corresponding micro-mirror.

17. The array of claim 13, further comprising drive circuitry for driving said springs to orient said micro-mirrors in response to incoming image data.

18. The array of claim 13, wherein said array of micro-mirrors is formed and supported on a substrate.

19. The array of claim 18, wherein said substrate comprises silicon.

20. The array of claim 18, wherein said substrate comprises glass or plastic.

21. The array of claim 14, wherein said flexure runs diagonally between opposite corners of said corresponding micro-mirror.

22. The array of claim 21, wherein said flexure has a non-uniform width.

23. The array of claim 14, wherein said flexure comprises a plurality of flexures extending from said post along an underside of said corresponding micro-mirror, wherein, during operation of said array, said plurality of flexures contact said corresponding micro-mirror and store energy due to movement of said corresponding micro-mirror.

24. The array of claim 14, wherein said supports have a square shape, with corners of said supports being matched with corners of said corresponding micro-mirror.

25. A spatial light modulation device comprising:
a micro-mirror; and
a pliant flexure supporting said micro-mirror, said pliant flexure having a bias, and including:
  a post;
  a flexure member supported on said post; and
  supports on said flexure member for supporting said micro-mirror;
wherein said pliant flexure stores energy due to said bias in response to any re-positioning of said micro-mirror away from a default orientation; and
wherein said pliant flexure releases said stored energy to drive movement of said micro-mirror when a force against said bias is relaxed.

26. The device of claim 25, wherein said pliant flexure holds said micro-mirror in said default orientation according to said bias when said pliant flexure is not driven.

27. The device of claim 25, wherein said pliant flexure comprises a piezoelectric element configured to bend said pliant flexure to controllably orient said micro-mirror.

28. The device of claim 25, further comprising a set of electrodes for electrostatically driving said pliant flexure to controllably orient said micro-mirror.

29. The device of claim 25, further comprising drive circuitry for driving said pliant flexure to orient said micro-mirror.

30. The device of claim 25, wherein said pliant flexure runs diagonally between opposite corners of said micro-mirror.

31. The device of claim 30, wherein said pliant flexure has a non-uniform width.

32. The device of claim 25, wherein said pliant flexure comprises a plurality of flexures extending from said post along an underside of said micro-mirror, wherein, during operation of said micro-mirror, said plurality of flexures contact said micro-mirror and store energy due to movement of said micro-mirror.

33. The device of claim 25, further comprising a plurality of micro-mirrors arranged in an array.

34. A micro-mirror device comprising:
a micro-mirror; and
a flexure spring, wherein said micro-mirror is supported on arms of said flexure spring, with supports connected between said arms and opposite corners of said micro-mirror,
wherein said flexure spring comprises a plurality of flexures disposed side-by-side, substantially parallel to each other and extending toward opposite corners of said micro-mirror;
wherein said flexure spring is configured to store potential energy during movement of said micro-mirror that is released as kinetic energy to drive movement of said micro-mirror when said micro-mirror is re-oriented.

35. The device of claim 34, wherein said supports have a square cross-section with corners of said supports being matched to said opposite corners of said micro-mirror.

36. The device of claim 34, wherein said plurality of flexures are unconnected arms extending from a central portion.

37. The device of claim 34, wherein said plurality of flexures compnses:
a flexure having said supports thereon connected to and for supporting said micro-mirror; and
at least one other flexure which only applies force to said micro-mirror when said micro-mirror tilts about said axis into contact with said at least one other flexure.

38. The device of claim 34, wherein said flexure spring is supported on a substrate in a dielectric liquid disposed on said substrate.

39. The device of claim 34, wherein any re-positioning of said micro-mirror away from a default position is resisted by a bias of said flexure spring.

40. A micro-mirror device comprising:
a micro-mirror; and
a flexure spring, wherein said micro-mirror is supported on arms of said flexure spring, with supports connected between said arms and opposite corners of said micro-mirror, said supports spacing said micro-mirror from said arms of said flexure spring,
wherein said flexure spring comprises a plurality of flexures disposed substantially parallel to each other and extending toward opposite corners of said micro-mirror, where movement of said micro-mirror brings said micro-mirror into contact with at least some of said plurality of flexures which then flex and store energy due to continued movement of said micro-mirror toward those flexing flexures;
wherein said flexure spring is configured to store potential energy during movement of said micro-mirror that is released as kinetic energy to drive movement of said micro-mirror when said micro-mirror is re-oriented.

* * * * *

UNITED STATES PATENT AND TRADEMARK OFFICE
CERTIFICATE OF CORRECTION

PATENT NO. : 7,046,415 B2 Page 1 of 1
APPLICATION NO. : 10/719222
DATED : May 16, 2006
INVENTOR(S) : Jilani et al.

It is certified that error appears in the above-identified patent and that said Letters Patent is hereby corrected as shown below:

In the Claims

Col. 8 (line 17), delete "compnses:" and insert therefor --comprises:--.

Signed and Sealed this

Twenty-seventh Day of February, 2007

JON W. DUDAS
*Director of the United States Patent and Trademark Office*